US012641593B2

(12) United States Patent
Zhao

(10) Patent No.: US 12,641,593 B2
(45) Date of Patent: May 26, 2026

(54) RESOURCE MULTIPLEXING METHOD AND DEVICE THEREOF FOR DIRECT DISTANCE MEASUREMENT

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/288,351

(22) PCT Filed: Apr. 28, 2021

(86) PCT No.: PCT/CN2021/090737
§ 371 (c)(1),
(2) Date: Oct. 25, 2023

(87) PCT Pub. No.: WO2022/226847
PCT Pub. Date: Nov. 3, 2022

(65) Prior Publication Data
US 2024/0224260 A1      Jul. 4, 2024

(51) Int. Cl.
*H04W 72/1263* (2023.01)
*H04W 72/25* (2023.01)

(52) U.S. Cl.
CPC ....... *H04W 72/1263* (2013.01); *H04W 72/25* (2023.01)

(58) Field of Classification Search
CPC .......................... H04W 72/1263; H04W 72/25
See application file for complete search history.

(56) References Cited

U.S. PATENT DOCUMENTS

2016/0330011 A1 * 11/2016 Lee ...................... H04W 52/243
2018/0048444 A1 * 2/2018 Park .................... H04L 27/2613
(Continued)

FOREIGN PATENT DOCUMENTS

CN      111213393 A    5/2020
CN      112119607 A1   12/2020
(Continued)

OTHER PUBLICATIONS

European patent application No. 21938332.0 Search Report dated May 22, 2024, 12 pages.
(Continued)

*Primary Examiner* — Parth Patel
(74) *Attorney, Agent, or Firm* — Cozen O'Connor

(57) ABSTRACT
A resource multiplexing method for sidelink ranging performed by a transmitting terminal includes performing a first sidelink transmission of a sidelink ranging signal and a physical sidelink channel through at least one of a frequency-division multiplexing or a time-division multiplexing within a same time unit. The sidelink ranging signal is a reference signal for measuring at least one of a distance or an angle; and the physical sidelink channel includes at least one of: a first physical sidelink channel for transmitting first sidelink control information; or a second physical sidelink channel for transmitting at least one of second sidelink control information or sidelink data. The first and second sidelink control information are related to at least one of a transmission of the sidelink data or the sidelink ranging signal; and at least one of the first physical sidelink channel, the second physical sidelink channel or a sidelink ranging signal transmission are associated with each other.

18 Claims, 5 Drawing Sheets

(56)     References Cited

U.S. PATENT DOCUMENTS

| | | | | |
|---|---|---|---|---|
| 2018/0220263 | A1* | 8/2018 | Jiang ..................... | G01S 13/825 |
| 2021/0250772 | A1* | 8/2021 | Farag ................... | H04W 16/02 |
| 2021/0298088 | A1* | 9/2021 | Qi ..................... | H04W 74/0833 |
| 2021/0377993 | A1* | 12/2021 | Ayaz ..................... | H04L 5/0094 |
| 2022/0039080 | A1* | 2/2022 | Khoryaev ............. | H04W 4/025 |
| 2022/0210768 | A1* | 6/2022 | Zhou ..................... | H04W 72/20 |
| 2024/0224260 | A1* | 7/2024 | Zhao ....................... | H04W 4/70 |

FOREIGN PATENT DOCUMENTS

| | | | | | |
|---|---|---|---|---|---|
| EP | | 3577960 B1 | 2/2021 | | |
| WO | WO-2018233521 A1 | * | 12/2018 | ........... | H04W 72/02 |
| WO | WO 2020198616 A1 | | 10/2020 | | |

OTHER PUBLICATIONS

PCT/CN2021/090737 International Search Report dated Jan. 26, 2022, 2 pages.

* cited by examiner

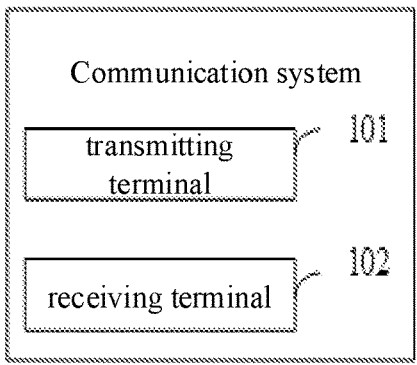

FIG. 1 perform a first sidelink transmission of a sidelink ranging signal and a physical sidelink channel through a frequency-division multiplexing and/or a time-division multiplexing within the same time unit ⟩ 10

FIG. 2

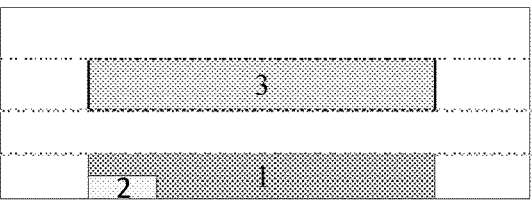

FIG. 3

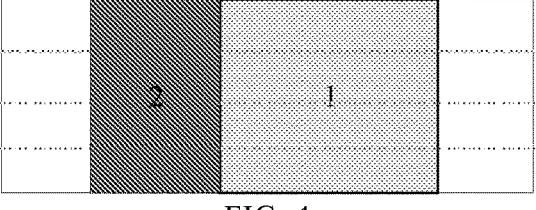

FIG. 4

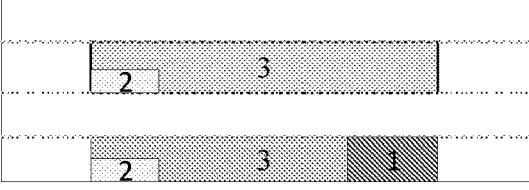

FIG. 5 perform the first sidelink transmission by mapping the sidelink ranging signal and the physical sidelink channel on different time resource locations of a consecutive time resource ⟩ 20

FIG. 6 sidelink ranging signal sidelink control information sidelink ranging signal sidelink control information

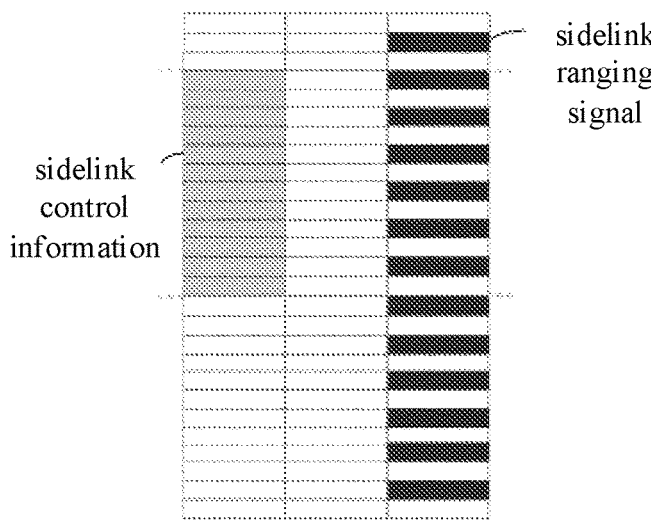
sidelink ranging signal
sidelink control information
FIG. 10
perform the first sidelink transmission of the sidelink ranging signal and the first physical sidelink channel through the frequency-division multiplexing on a time resource occupied by the first physical sidelink channel
30
FIG. 11
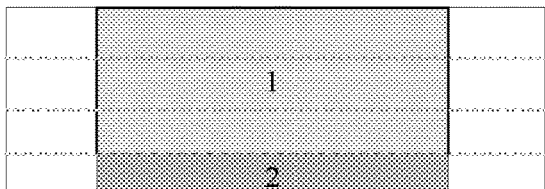
FIG. 12
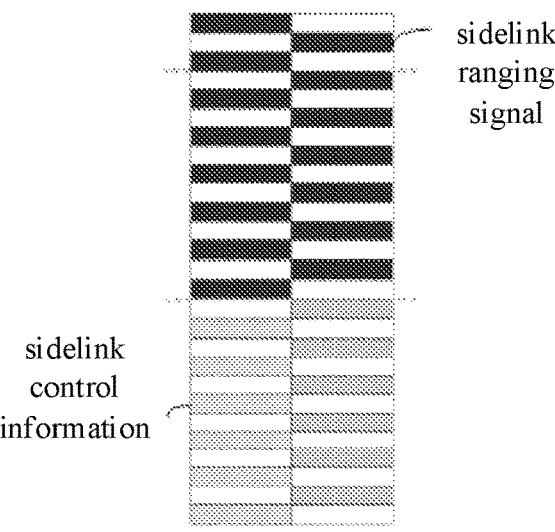
sidelink ranging signal
sidelink control information
FIG. 13

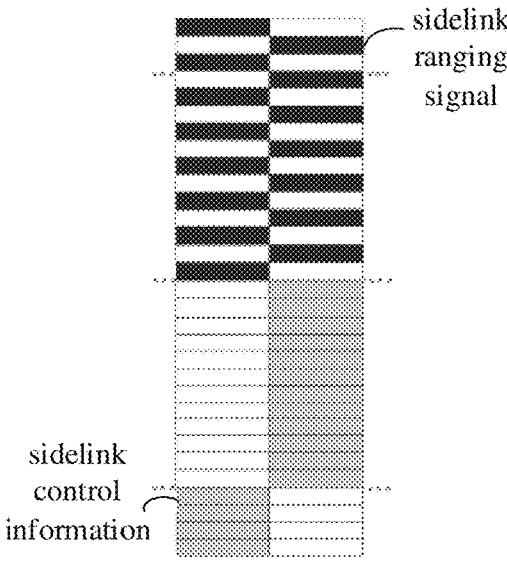

sidelink ranging signal sidelink control information

FIG. 14

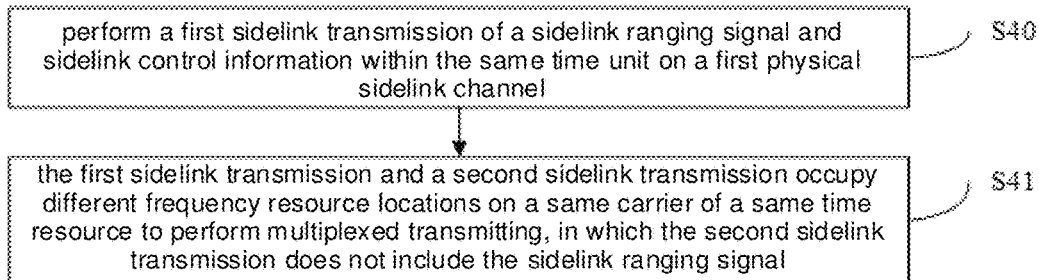

perform a first sidelink transmission of a sidelink ranging signal and sidelink control information within the same time unit on a first physical sidelink channel — S40 the first sidelink transmission and a second sidelink transmission occupy different frequency resource locations on a same carrier of a same time resource to perform multiplexed transmitting, in which the second sidelink transmission does not include the sidelink ranging signal — S41

FIG. 15

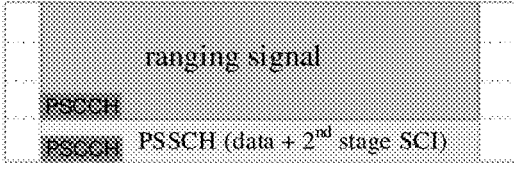

ranging signal

PSSCH

PSSCH (data + 2$^{nd}$ stage SCI)

FIG. 16

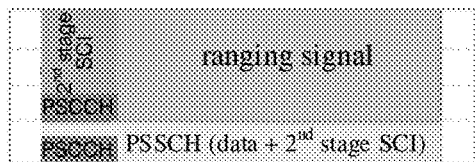

ranging signal

PSSCH

PSSCH (data + 2$^{nd}$ stage SCI)

FIG. 17

2$^{nd}$ stage SCI  ranging signal

PSSCH

PSSCH (data + 2$^{nd}$ stage SCI)

FIG. 18

RESOURCE MULTIPLEXING METHOD AND DEVICE THEREOF FOR DIRECT DISTANCE MEASUREMENT

CROSS-REFERENCE TO RELATED APPLICATION

This application is a national phase of International Application No. PCT/CN2021/090737, filed on Apr. 28, 2021, the content of which is hereby incorporated by reference in its entirety.

TECHNICAL FIELD

The disclosure relates to a field of communication technologies, in particular to a resource multiplexing method for sidelink ranging and an apparatus thereof.

BACKGROUND

In a wireless communication system, a successful transmission between two devices includes acquiring certain position/angle and/or distance/range information between the two devices before the transmission. In the related art, in order to support dynamic time-frequency resource allocation for a ranging signal, in addition to a ranging reference signal, a transmitting device also needs to send physical layer control information for indicating a time-frequency resource used by the ranging reference signal and/or parameters about the transmission of the ranging reference signal.

SUMMARY

According to a first aspect of embodiments of the disclosure, a resource multiplexing method for sidelink ranging, performed by a transmitting terminal, is provided. The method includes: performing a first sidelink transmission of a sidelink ranging signal and a physical sidelink channel through at least one of a frequency-division multiplexing or a time-division multiplexing within the same time unit, in which the sidelink ranging signal is a reference signal for measuring at least one of a distance or an angle; and the physical sidelink channel includes at least one of: a first physical sidelink channel for transmitting first sidelink control information; or a second physical sidelink channel for transmitting at least one of second sidelink control information or sidelink data; in which the first sidelink control information and the second sidelink control information are related to at least one of a transmission of the sidelink data or a transmission of the sidelink ranging signal; and at least one of the first physical sidelink channel, the second physical sidelink channel or a sidelink ranging signal transmission are associated with each other.

According to a second aspect of embodiments of the disclosure a resource multiplexing method for sidelink ranging, which is performed by a receiving terminal is provided. The method includes: receiving a first sidelink transmission sent through resource multiplexing by a transmitting terminal, in which the first sidelink transmission of a sidelink ranging signal and a physical sidelink channel is performed by the transmitting terminal through at least one of a frequency-division multiplexing or a time-division multiplexing; in which the sidelink ranging signal is a reference signal for measuring a distance and/or an angle; and the physical sidelink channel comprises at least one of: a first physical sidelink channel for transmitting first sidelink control information; or a second physical sidelink channel for transmitting at least one of second sidelink control information or sidelink data; in which the first sidelink control information and the second sidelink control information are related to at least one of a transmission of the sidelink data or a transmission of the sidelink ranging signal; and at least one of the first physical sidelink channel, the second physical sidelink channel or a sidelink ranging signal transmission are associated with each other.

According to a third aspect of embodiments of the disclosure, a communicating device is provided. The communicating device includes: a processor. When the processor calls a computer program stored in a memory, the method described in the first aspect above is implemented.

BRIEF DESCRIPTION OF THE DRAWINGS

In order to clearly illustrate technical solutions of embodiments of the disclosure or background technologies, a description of drawings used in the embodiments or the background technologies is given below.

FIG. 1 is a schematic diagram illustrating a resource multiplexing method for sidelink ranging according to an embodiment of the disclosure.

FIG. 2 is a schematic diagram illustrating a resource multiplexing method for sidelink ranging according to an embodiment of the disclosure.

FIG. 3 is a schematic diagram illustrating a resource multiplexing method for sidelink ranging according to an embodiment of the disclosure.

FIG. 4 is a schematic diagram illustrating a resource multiplexing method for sidelink ranging according to an embodiment of the disclosure.

FIG. 5 is a schematic diagram illustrating a resource multiplexing method for sidelink ranging according to an embodiment of the disclosure.

FIG. 6 is a schematic diagram illustrating a resource multiplexing method for sidelink ranging according to an embodiment of the disclosure.

FIG. 10 is a schematic diagram illustrating a resource multiplexing method for sidelink ranging according to an embodiment of the disclosure.

FIG. 11 is a schematic diagram illustrating a resource multiplexing method for sidelink ranging according to an embodiment of the disclosure.

FIG. 12 is a schematic diagram illustrating a resource multiplexing method for sidelink ranging according to an embodiment of the disclosure.

FIG. 13 is a schematic diagram illustrating a resource multiplexing method for sidelink ranging according to an embodiment of the disclosure.

FIG. 14 is a schematic diagram illustrating a resource multiplexing method for sidelink ranging according to an embodiment of the disclosure.

FIG. 15 is a schematic diagram illustrating a resource multiplexing method for sidelink ranging according to an embodiment of the disclosure.

FIG. 16 is a schematic diagram illustrating a resource multiplexing method for sidelink ranging according to an embodiment of the disclosure.

FIG. 17 is a schematic diagram illustrating a resource multiplexing method for sidelink ranging according to an embodiment of the disclosure.

FIG. 18 is a schematic diagram illustrating a resource multiplexing method for sidelink ranging according to an embodiment of the disclosure.

DETAILED DESCRIPTION

Figure 7:
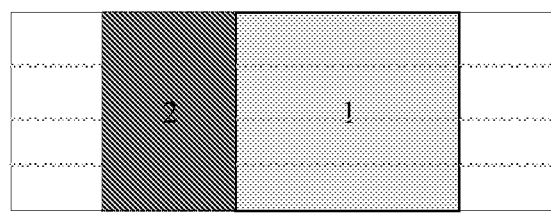
FIG. 7 is a schematic diagram illustrating a resource multiplexing method for sidelink ranging according to an embodiment of the disclosure.

Embodiments of the disclosure will be described in detail below, examples of which are shown in the accompanying drawings, in which the same or similar numbers represent the same or similar elements or elements with the same or similar functions. The embodiments described below with reference to the drawings are examples and are intended to explain the disclosure, and should not be construed as limiting the disclosure.

For ease of understanding, the terms involved in this disclosure are introduced at first.

1. Time-Division Multiplexing (TDM)

With the TDM technology, different signals are interweaved in different time periods and transmitted on the same channel. A receiving end uses a certain method to extract the signals in each time period and restore into the original signals. This communication technology can transmit multiple signals on the same channel.

2. Frequency-Division Multiplexing (FDM)

With the FDM technology, a total bandwidth used for channel transmission is divided into several sub-bands (or sub-channels), and each sub-channel transmits one signal. The FDM requires a total frequency width to be greater than a sum of frequencies of each sub-channel. Meanwhile, in order to ensure that the signals transmitted on each sub-channel do not interfere with each other, isolation bands should be set up among sub-channels to ensure that the signals on the channels do not interfere with each other.

In order to better understand the resource multiplexing method for sidelink ranging according to embodiments of the disclosure, the communication system used in embodiments of the disclosure is first described below.

As illustrated in FIG. 1, FIG. 1 is a schematic diagram of a communication system provided by an embodiment of the disclosure. The communication system may include, but is not limited to, a terminal device. The number and form of devices shown in FIG. 1 are only for examples and do not constitute a limitation on the embodiments of the disclosure, and two or more terminal devices may be included in practical applications. The communication system shown in FIG. 1 includes, for example, a sending terminal device 101 and a receiving terminal device 102.

It should be noted that the technical solutions of the embodiments of the disclosure can be applied to various types of communication systems, such as, a long term evolution (LTE) system, a 5th generation (5G) mobile communication system, a 5G new radio (NR) system, or other future new mobile communication systems.

The sending terminal device 101 and the receiving terminal device 102 in the embodiments of the disclosure are entities on a user side for transmitting or receiving signals, such as mobile phones. For example, the sending terminal device 101 and the receiving terminal device 102 may also be referred to as terminals, user equipments (UEs), mobile stations (MSs), mobile terminals (MTs), and the like. The terminal device can be a car with communication functions, a smart car, a mobile phone, a wearable device, a Pad, a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form adopted by the terminal device are not limited in the embodiments of the disclosure.

It is understood that the communication system described in the embodiments of the disclosure is intended to more clearly illustrate the technical solutions of the embodiments of the disclosure, and does not constitute a limitation on the technical solutions provided by the embodiments of the disclosure. It is understood by those skilled in the art that as system architectures evolve and new business scenarios emerge, the technical solutions provided by the embodiments of the disclosure are also applicable to similar technical problems.

It is understandable that the solutions of the embodiments of the disclosure may be implemented either individually or in combination, which is not limited in the disclosure.

In the related art, in order to support dynamic time-frequency resource allocation for a ranging signal, in addition to a ranging reference signal, a transmitting device also needs to send physical layer control information for indicating a time-frequency resource used by the ranging reference signal and/or parameters about the transmission of the ranging reference signal, and thus it is necessary to design a time-frequency resource multiplexing method for these physical layer signals and channels, to avoid interference with each other and to avoid affecting transmission performance A resource multiplexing method for sidelink ranging and an apparatus thereof will be introduced in detail below with reference to the accompanying drawings.

FIG. 2 is a schematic diagram illustrating a resource multiplexing method for sidelink ranging according to an embodiment of the disclosure. The method is performed by a transmitting terminal. As illustrated in FIG. 2, the method further includes the following.

At step S10, a first sidelink transmission of a sidelink ranging signal and a physical sidelink channel is performed through a FDM and/or a TDM within a same time unit.

With the development of sidelink communication between terminals, applications and services based on the distance and angle between terminal devices are emerging, which can be applied in a variety of commercial and vertical application scenarios including merchandise display, smart home, smart city, smart transportation, and smart retail. Therefore, distance and angle measurements via radio signals need to be addressed urgently. The distance and/or angle measurements via radio signals can effectively utilize the wireless communication capabilities of terminal devices and introduce new capabilities of terminal devices. In applications, the transmitting terminal may send a sidelink ranging signal to the receiving terminal, and the receiving terminal may perform the distance and/or angle measurements based on the sidelink ranging signal. That is, the sidelink ranging signal is a reference signal for measuring the distance or the angle.

In order to support dynamic allocation of the time-frequency resource for a sidelink ranging signal and utilization of the time-frequency resource, in addition to transmitting the sidelink ranging signal, the transmitting terminal may multiplex the resource to transmit another physical sidelink channel within the same time unit. For example, the same time unit may be a same slot, or may be several consecutive time domain symbols or a single time domain symbol.

As a possible implementation, the physical sidelink channel may include a first physical sidelink channel which is a physical sidelink channel for transmitting first sidelink control information. For example, the first physical sidelink channel may be a Physical Sidelink Control Channel (PSCCH). As an example, the first sidelink control information transmitted on the first physical sidelink channel may be physical control information for indicating a time-frequency resource used by a sidelink ranging signal and/or a transmission parameter of the sidelink ranging signal.

As a possible implementation, the physical sidelink channel may include a second physical sidelink channel which is a physical sidelink channel for transmitting second sidelink control information and/or sidelink data. For example, the second physical sidelink channel may be a Physical Sidelink Shared Channel (PSSCH). As an example, the sidelink data transmission includes transmitting the PSSCH carrying the sidelink data and the PSCCH associated with the PSSCH.

As a possible implementation, the physical sidelink channel may include both the first physical sidelink channel for transmitting the first sidelink control information and the second physical sidelink channel for transmitting the second sidelink control information and/or sidelink data as described above.

The first sidelink control information and the second sidelink control information are related to the transmission of the sidelink data and/or the transmission of the sidelink ranging signal, and the first physical sidelink channel, the second physical sidelink channel and/or the sidelink ranging signal transmission are associated with each other.

When transmitting the sidelink ranging signal and the physical sidelink channel in a multiplexing manner, the first sidelink transmission of the sidelink ranging signal and the physical sidelink channel within the same time unit is performed through the FDM. That is, the first sidelink transmission of the sidelink ranging signal and the first physical sidelink channel and/or the second physical sidelink channel is performed through the FDM. As illustrated in FIG. 3, a resource is multiplexed through the FDM to transmit the sidelink ranging signal 1, the first physical sidelink channel 2, and a second physical sidelink channel 3. That is, the time resource occupied by the sidelink ranging signal 1, the time resource occupied by the first physical sidelink channel 2 and the time resource occupied by the second physical sidelink channel 3 are the same, but the frequency resources, on the time resource, occupied by the sidelink ranging signal 1, the first physical sidelink channel 2, and the second physical sidelink channel 3 are different.

For example, when transmitting the sidelink ranging signal and the physical sidelink channel in the multiplexing manner, the first sidelink transmission of the sidelink ranging signal and the physical sidelink channel can be performed on the same frequency through the TDM. That is, the first sidelink transmission of the sidelink ranging signal and the first physical sidelink channel and/or the second physical sidelink channel is performed through the TDM. As illustrated in FIG. 4, the resource is multiplexed through the TDM to transmit the sidelink ranging signal 1 and the first physical sidelink channel 2, in which the first physical sidelink channel 2 occupies a former portion of the time resource, and the sidelink ranging signal 1 occupies a latter portion of the time resource.

For example, when transmitting the sidelink ranging signal and the physical sidelink channel in the multiplexing manner, the first sidelink transmission of the sidelink ranging signal and the physical sidelink channel within the same time unit can be performed through the FDM and the TDM. That is, the first sidelink transmission of the sidelink ranging signal and the first physical sidelink channel and/or the second physical sidelink channel is performed through the FDM and the TDM. As illustrated in FIG. 5, the resource is multiplexed through the FDM and the TDM to transmit the sidelink ranging signal 1, the first physical sidelink channel 2, and the second physical sidelink channel 3. For example, the TDM is performed to transmit the sidelink ranging signal 1 and the second physical sidelink channel 3, in which the sidelink ranging signal 1 occupies a portion of the time resource, the second physical sidelink channel 3 occupies another portion of the time resource, the sidelink ranging signal 1 and the second physical sidelink channel 3 occupy different frequency resources of that time resource, and the first physical sidelink channel 2 also occupies a different frequency resource.

With the resource multiplexing method for sidelink ranging according to embodiments of the disclosure, by performing the first sidelink transmission of the sidelink ranging signal and the physical sidelink channel through the FDM and/or the TDM within the same time unit, interference between the sidelink ranging signal and the physical sidelink channel during the transmission can be avoided, and the transmission performance can be improved.

Within the same time unit, the sidelink ranging signal and the physical sidelink channel are transmitted through the TDM of the resource. FIG. 6 is a schematic diagram illustrating a resource multiplexing method for sidelink ranging according to an embodiment of the disclosure. The method is performed by a transmitting terminal. As illustrated in FIG. 6, the method includes the following.

At step S20, the first sidelink transmission is performed by mapping the sidelink ranging signal and the physical sidelink channel on different time resource locations of a consecutive time resource.

In embodiments of the disclosure, the first sidelink transmission is performed by mapping the sidelink ranging signal and the physical sidelink channel on different time resource locations of the consecutive time resource. That is, the physical sidelink channel is mapped to a former portion of time resource locations of the consecutive time resource, and the sidelink ranging signal is mapped to a latter portion of time resource locations of the consecutive time resource. In some implementations, if the physical sidelink channel is the first physical sidelink channel, the sidelink ranging signal and the first sidelink control information are mapped to different time resource locations of the consecutive time resource to perform the first sidelink transmission. As illustrated in FIG. 7, the sidelink ranging signal 1 and the first physical sidelink channel 2 are mapped to different time resource locations of the consecutive time resource to perform the first sidelink transmission, the first physical sidelink channel 2 is mapped to the former portion of time resource locations of the consecutive time resource, and the sidelink ranging signal 1 is mapped to the latter portion of time resource locations of the consecutive time resource. In some implementations, if the physical sidelink channel is the second physical sidelink channel, the sidelink ranging signal and the second sidelink control information and/or sidelink data are mapped to different time resource locations of the consecutive time resource to perform the first sidelink transmission. As an example, the second physical sidelink channel 3 is mapped to the former portion of time resource locations of the consecutive time resource, and the sidelink ranging signal 1 is mapped to the latter portion of time resource locations of the consecutive time resource. As another example, the sidelink ranging signal 1 is mapped to the former portion of time resource locations of the consecutive time resource, and the second physical sidelink channel 3 is mapped to the latter portion of time resource locations of the consecutive time resource.

In some implementations, if the physical sidelink channels include both the first physical sidelink channel and the second physical sidelink channel, the first sidelink transmission is perform by mapping the sidelink ranging signal, the first sidelink control information, the second sidelink control information and/or the sidelink data to different time resource locations of the consecutive time resource. As an example, the first physical sidelink channel 2 is mapped to a first portion of time resource locations of the consecutive time resource, the sidelink ranging signal 1 is mapped to an intermediate portion of time resource locations of the consecutive time resource, and the second physical sidelink channel 3 is mapped to a last portion of time resource locations of the consecutive time resource. As another example, the first physical sidelink channel 2 is mapped to the first portion of time resource locations of the consecutive time resource, the second physical sidelink channel 3 is mapped to the intermediate portion of time resource locations of the consecutive time resource, and the sidelink ranging signal 1 is mapped to the last portion of time resource locations of the consecutive time resource. The above are only examples of mapping the above three to different time resource locations of the consecutive time resource and are not to be taken as limiting the disclosure herein.

As an implementation, the first sidelink transmission is carried out by mapping the sidelink ranging signal and the physical sidelink channel to different time resource locations of the consecutive time resource, in which a protection interval is provided between the transmission of the sidelink ranging signal and the transmission of the physical sidelink channel. A length of the protection interval may be determined by predefinition or pre-configuration. Or, the length of the protection interval may be determined based on a carrier frequency and/or a subcarrier spacing used for the first sidelink transmission.

As an implementation, a transmit power of the first sidelink transmission is the same on each time domain symbol within a transmission time, to ensure that the receive power on each time domain symbol is the same at the receiving device, thereby avoiding the requirement of time by adjusting the radio frequency amplifier and the influence on the reception effect of sidelink data.

As an implementation, the respective frequency domain resource occupied on each time domain symbol is the same. As an implementation, the frequency domain resource being the same means that the starting positions and the sizes of the frequency domain resources are the same, to convenient for the resource indication for sidelink ranging signals while avoiding the need to introduce a transmission switching time between the transmission of the sidelink control information and the transmission of the sidelink ranging signal due to a change in the transmit power spectral density.

As an implementation, when measuring the distances and angles between a plurality of terminal devices, the frequency resource occupied by the sidelink ranging signal may be multiplexed in a comb-shape manner, to achieve a higher utilization of the resource. In some implementations, the sidelink ranging signal and/or the physical sidelink channel may be mapped to frequency domain resources in a comb-shape manner. For example, the sidelink ranging signal and/or the first physical sidelink channel for transmitting the first control information may be transmitted by the multiplexing in a comb-shape manner. Below, the multiplexing in the comb-shape manner will be explained below by taking transmitting the sidelink ranging signal and the first physical sidelink channel for transmitting the first control information through the resource multiplexing as an example, in which the first control information may be control information for the sidelink ranging corresponding to the sidelink ranging signal.

Figure 8:
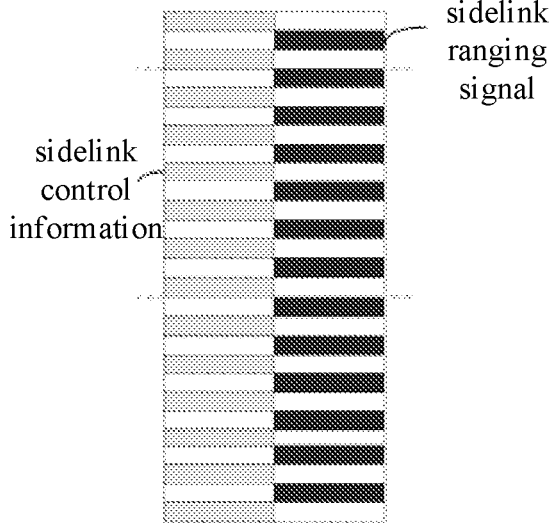
FIG. 8 is a schematic diagram illustrating a resource multiplexing method for sidelink ranging according to an embodiment of the disclosure.

With respect to the comb-shape mapping, a comb-shape multiplexing factor (i.e., the number of frequency domain intervals for the comb-shape mapping) is determined by predefinition, preconfiguration, or receiving a downlink control signaling from a receiving network device. As illustrated in FIG. 8, for example, the comb-shape multiplexing factor is 2, and the number of the frequency domain intervals for the comb-shape mapping is 1, i.e., the mapping is performed every frequency domain interval. It is noteworthy that the number of the frequency domain intervals for the comb-shape mapping of the sidelink ranging signal is the same as that for the comb-shape mapping of the physical sidelink channel. An initial frequency domain offset for the comb-shape mapping of the sidelink ranging signal is in a determined mapping relation with an initial frequency domain offset for the comb-shape mapping of the physical sidelink channel, or the initial frequency domain offset for the comb-shape mapping of the sidelink ranging signal is in a determined mapping relation with a frequency domain location of the physical sidelink channel. In this way, the resource utilization is effectively improved under the condition of guaranteeing the reference signal transmission bandwidth. The wider the reference signal transmission bandwidth, the higher the ranging accuracy of the reference signal.

As an implementation, the comb-shape multiplexing factor for the sidelink ranging signal can be the same as or different from the comb-shape multiplexing factor for the physical sidelink channel that is transmitted through multiplexing the resource with the sidelink ranging signal, and the frequency domain offset for the comb-shape multiplexing of the sidelink ranging signal may be the same as or different from the frequency domain offset for the comb-shape multiplexing of the physical sidelink channel.

As an implementation, the user equipment may determine, by receiving downlink signaling configuration from a base station or reading pre-configuration information, respective comb-shape multiplexing factors and respective frequency domain offsets for the sidelink ranging signal and the physical sidelink channel that is transmitted through multiplexing the resource with the sidelink ranging signal.

As an implementation, the first sidelink transmission of the sidelink ranging signal and the first sidelink control information corresponding to the sidelink ranging signal may be performed through the TDM. That is, the sidelink ranging signal and the first sidelink control information corresponding to the sidelink ranging signal occupy the same frequency domain resource. A protection interval is provided between the time domain symbols for transmitting the sidelink ranging signal and the time domain symbols for transmitting the first sidelink control information corresponding to the sidelink ranging signal. The transmission of the sidelink ranging signal and the transmission of the physical sidelink channel use different transmit powers, or the transmission of the sidelink ranging signal and the transmission of the physical sidelink channel use different frequency domain bandwidths, or the transmission of the sidelink ranging signal and the transmission of the physical sidelink channel use different antenna configurations and/or precoding matrices.

Figure 9:
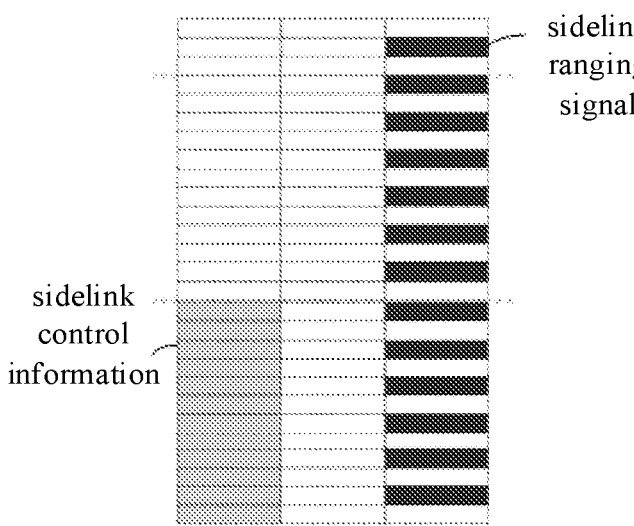
FIG. 9 is a schematic diagram illustrating a resource multiplexing method for sidelink ranging according to an embodiment of the disclosure.

In some implementations, as illustrated in FIGS. 9 and 10, there is a correspondence between the frequency domain resource location of the sidelink ranging signal and the comb-shape offset of the control information corresponding to the sidelink ranging signal, so that different frequency domain locations correspond to different comb-shape offsets, to ensure that the control information and the sidelink ranging signal are both frequency domain orthogonal if either of them is frequency domain orthogonal.

With the resource multiplexing method for sidelink ranging according to embodiments of the disclosure, through the TDM, the first sidelink transmission is carried out by mapping the sidelink ranging signal and the physical sidelink channel to different time resource locations of the consecutive time resource. Therefore, the utilization of the time domain resource is improved, and the interference between the sidelink ranging signal and the physical sidelink channel during the transmission can be avoided, which improves the transmission performance.

The sidelink ranging signal and the physical sidelink channel are transmitted by multiplexing the resource through the FDM within the same time unit. FIG. 11 is a schematic diagram illustrating a resource multiplexing method for sidelink ranging according to an embodiment of the disclosure. The method is performed by a transmitting terminal. As illustrated in FIG. 11, the method includes the following.

At step S30, the first sidelink transmission of the sidelink ranging signal and the first physical sidelink channel is performed through the FDM on a time resource occupied by the first physical sidelink channel.

As an implementation, the first physical sidelink channel is used for transmitting the first sidelink control information. The first sidelink control information may be control information corresponding to the sidelink ranging signal. The first physical sidelink channel occupies one or more time domain resources. Correspondingly, the first sidelink transmission of the sidelink ranging signal and the first physical sidelink channel is carried out through the FDM on the one or more occupied time domain resources. As illustrated in FIG. 12, the first sidelink transmission of the sidelink ranging signal 1 and the sidelink control information of the first physical sidelink channel 2 is performed through the FDM.

As an implementation, in a scenario where distances and angles are measured between multiple terminal devices, the sidelink ranging signal can be transmitted through the multiplexing in a comb-shape manner on the frequency resource occupied, to achieve a higher utilization of the resource. In some implementations, the control information corresponding to the sidelink ranging signal may be transmitted through the multiplexing in the comb-shape manner, and the sidelink ranging signal and the physical sidelink channel that is transmitted by multiplexing the resource with the sidelink ranging signal are mapped to the frequency domain resource in a comb-shape manner.

In some implementations, the transmission of the sidelink ranging signal and the transmission of the control information corresponding to the sidelink ranging signal may be performed through the FDM. As above, the multiplexing in the comb-shape manner can be performed for the transmission of the sidelink ranging signal. As illustrated in FIG. 13, the multiplexing in the comb-shape manner can be performed for the transmission of the sidelink control information corresponding to the sidelink ranging signal. As illustrated in FIG. 14, the transmission of the sidelink control information corresponding to the sidelink ranging signal may be performed through the FDM.

With the resource multiplexing method for sidelink ranging according to embodiments of the disclosure, by performing the first sidelink transmission of the sidelink ranging signal and the physical sidelink channel through the FDM on the time resource occupied by the first physical sidelink channel, the utilization of the time domain resource is improved, interference between the sidelink ranging signal and the physical sidelink channel during the transmission can be avoided, and the transmission performance can be improved.

FIG. 15 is a schematic diagram illustrating a resource multiplexing method for sidelink ranging according to an embodiment of the disclosure. The method is performed by a transmitting terminal. As illustrated in FIG. 15, the method further includes the following.

At step S40, a first sidelink transmission of a sidelink ranging signal and sidelink control information is performed on a first physical sidelink channel within the same time unit.

Step S40 has been specifically described in the above embodiments and will not be repeated herein.

At step S41, the first sidelink transmission and a second sidelink transmission occupy different frequency resource locations on the same carrier of the same time resource to perform a multiplexed transmission, in which the second sidelink transmission does not include the sidelink ranging signal.

As an implementation, the second sidelink transmission may be a physical sidelink channel for transmitting other sidelink control information and/or sidelink data.

As an implementation, both the first sidelink transmission and the second sidelink transmission include the first physical sidelink channel. As illustrated in FIG. 16, the first sidelink transmission includes the sidelink ranging signal and the first physical sidelink channel, such as a PSCCH, for transmitting the first sidelink control information. The second sidelink transmission may include a PSSCH carrying sidelink data, and also includes the second physical sidelink channel, such as a PSCCH, for transmitting the second sidelink control information.

As an implementation, a format of the first sidelink control information, transmitted in the first sidelink transmission, carried on the first physical sidelink channel is the same as a format of the second sidelink control information, transmitted in the second sidelink transmission, carried on the first physical sidelink channel. As an implementation, the first sidelink control information and the second sidelink control information are mapped to the same time-frequency resource location of respective first physical sidelink channels.

The sidelink control information may be transmitted before the sidelink ranging signal, to reduce the processing delay at the receiving end. As an implementation, in embodiments of the disclosure, the control information for the sidelink ranging includes two portions, i.e., the 1st stage sidelink control information (SCI) and the 2nd stage SCI. As an implementation, the first sidelink control information is used as the control information for sidelink ranging corresponding to the sidelink ranging signal, in which thus control information includes time-frequency resource information used by the sidelink ranging signal.

The first sidelink control information is transmitted using the first physical sidelink channel that is the same as the first physical sidelink channel for transmitting the 1 st stage SCI corresponding to the sidelink data. That is, a set of possible time-frequency resource locations for transmitting the 1st stage SCI for the sidelink ranging is the same of a set of possible time-frequency resource locations for transmitting the 1st stage SCI corresponding to the sidelink data transmission or is a subset of the latter. In this way, the user equipment can know the resource occupation situation of the sidelink data transmission of the surrounding devices and the resource occupation situation of the sidelink ranging transmission through the same first physical sidelink channel sensing process, which is favorable for the user equipment to make flexible resource selection to avoid conflict between the transmission of the sidelink ranging signal and the transmission of the sidelink data.

In response to the first sidelink control information not including 2nd stage SCI and 1st stage SCI of the first sidelink control information occupying a frequency resource less than the frequency resource occupied by the sidelink ranging signal, target time domain symbol(s) occupied by the 1st stage SCI is/are determined, and part of the sidelink ranging signal is mapped to remaining resource elements (REs), that are not occupied by the $1^{st}$ stage SCI, of the target time domain symbol(s). It is noteworthy that a shorter generation sequence can be used on the target time domain symbol(s), or the ranging signal that was originally expected to be mapped on the REs occupied by the SCI can be punctured.

In response to the first sidelink control information including the 2nd stage SCI, the 2nd stage SCI is mapped to remaining REs, that are not occupied by the 1st stage SCI, of the target time domain symbol(s), as illustrated in FIG. 17, or the 2nd stage SCI is mapped to consecutive time domain symbols located after the target time domain symbol(s), as illustrated in FIG. 18.

As an implementation, a frequency domain resource allocation granularity of the first sidelink transmission is an integer multiple of a minimum frequency domain resource allocation granularity of the second sidelink transmission, so that the user equipment can monitor the resource utilization of both at the same time.

When the resource multiplexing method for sidelink ranging according to the above embodiments is performed by a receiving terminal, the method of the above embodiments is consistent with the method performed by the transmitting termina, which has been described in detail in the above embodiment and will not be repeated here.

In the above-described embodiments of the disclosure, the methods according to embodiments of the disclosure are described from the perspectives of the transmitting terminal and the receiving terminal respectively. In order to realize the functions in the methods according to the above embodiments of the disclosure, the transmitting terminal and the receiving terminal may include a hardware structure and a software module, to realize each of the above functions in the form of hardware structure, software module, or combination of hardware structure and software module. A certain function of the above-described functions may be performed in the form of hardware structure, software module, or combination of hardware structure and software module.

Embodiments of the disclosure further provide a communication apparatus, which may be a transmitting terminal (e.g. the transmitting terminal in the preceding method embodiments), a device in the transmitting terminal, or a device capable of being used in combination with the transmitting terminal. Or, the communication apparatus may be a receiving terminal, a device in the receiving terminal, or a device capable of being used with the receiving terminal.

Figure 19:
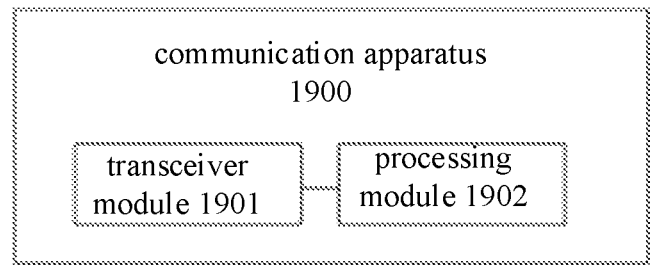
FIG. 19 is a schematic diagram illustrating a resource multiplexing apparatus for sidelink ranging according to an embodiment of the disclosure.

As illustrated in FIG. 19, FIG. 19 is a schematic diagram illustrating a communication apparatus according to an embodiment of the disclosure. The communication apparatus 1900 includes: a transceiver module 1901 and a processing module 1902.

The transceiver module 1901 may include a transmitting module and/or a receiving module. The transmitting module is configured to realize a transmitting function, and the receiving module is configured to realize a receiving function. The transceiver module 1901 may realize the transmitting function and/or the receiving function.

The communication apparatus 1900, which is a transmitting terminal, includes: the transceiver module 1901 and the processing module 1902.

The transceiver module 1901 is configured to obtain a sidelink ranging signal and a physical sidelink channel.

The processing module 1902, configured to perform a first sidelink transmission of the sidelink ranging signal and the physical sidelink channel through a FDM and/or a TDM within the same time unit, in which the sidelink ranging signal is a reference signal for measuring a distance and/or an angle; and the physical sidelink channel at least including one of: a first physical sidelink channel for transmitting first sidelink control information; or a second physical sidelink channel for transmitting second sidelink control information and/or sidelink data; in which the the first sidelink control information and the second sidelink control information are related to a transmission of the sidelink data and/or a transmission of the sidelink ranging signal, and the first physical sidelink channel, the second physical sidelink channel and/or a sidelink ranging signal transmission are associated with each other.

As an implementation, the processing module 1902 is further configured to: perform the first sidelink transmission by mapping the sidelink ranging signal and the physical sidelink channel on different time resource locations of a consecutive time resource; and/or perform the first sidelink transmission of the sidelink ranging signal and the first physical sidelink channel through the FDM on a time resource occupied by the first physical sidelink channel.

As an implementation, for the processing module 1902, the first sidelink transmission and a second sidelink transmission occupy different frequency resource locations on a same carrier of a same time resource, in which the second sidelink transmission does not include the sidelink ranging signal.

As an implementation, for the processing module 1902, the first sidelink transmission and the second sidelink transmission include respective first physical sidelink channels.

As an implementation, for the processing module 1902, a format of the first sidelink control information, transmitted in the first sidelink transmission, carried on the first physical sidelink channel is same as a format of the second sidelink control information, transmitted in the second sidelink transmission, carried on the first physical sidelink channel transmitted in the second sidelink transmission.

As an implementation, the processing module 1902 is further configured to: map the first sidelink control information and the second sidelink control information to a same time-frequency resource location of the respective first physical sidelink channels.

As an implementation, the processing module 1902 is further configured to: in response to the first sidelink control information not including 2nd stage SCI and 1 st stage SCI of the first sidelink control information occupying a frequency resource less than a frequency resource occupied by the sidelink ranging signal, determine a target time domain symbol occupied by the 1st stage SCI, and map part of the sidelink ranging signal to remaining REs, not occupied by the 1st stage SCI, of the target time domain symbol; or, in response to the first sidelink control information including the 2nd stage SCI, map the 2nd stage SCI to remaining REs, not occupied by the 1st stage SCI, of the target time domain symbol, or map the 2nd stage SCI to consecutive time domain symbols located after the target time domain symbol.

As an implementation, for the processing module 1902, a frequency domain resource allocation granularity of the first sidelink transmission is an integer multiple of a minimum frequency domain resource allocation granularity of the second sidelink transmission.

As an implementation, for the processing module 1902, a respective transmit power of the first sidelink transmission on each time domain symbol within a transmission time is equal to each other, a respective starting location of an occupied frequency domain resource on each time domain symbol is identical, and a respective size of an occupied frequency domain resource on each time domain symbol is identical.

As an implementation, for the processing module 1902, performing the first sidelink transmission by mapping the sidelink ranging signal and the physical sidelink channel on different time resource locations of the consecutive time resource includes: providing a protection interval between the transmission of the sidelink ranging signal and the transmission of the physical sidelink channel.

As an implementation, the processing module 1902 is further configured to: determine a length of the protection interval by predefinition or preconfiguration; or, determine the length of the protection interval based on a carrier frequency and/or a subcarrier spacing used in the first sidelink transmission.

As an implementation, for the processing module 1902, a transmit power used by the transmission of the sidelink ranging signal is different from a transmit power used by the transmission of the physical sidelink channel; or a frequency domain bandwidth used by the transmission of the sidelink ranging signal is different from the frequency domain bandwidth used by the transmission of the physical sidelink channel; or an antenna configuration and/or a precoding matrix used by the transmission of the sidelink ranging signal is/are different from the antenna configuration and/or the precoding matrix used by the transmission of the physical sidelink channel.

As an implementation, the processing module 1902 is further configured to: map the sidelink ranging signal to a frequency domain resource in a comb-shape manner.

As an implementation, the processing module 1902 is further configured to: determine a number of frequency domain intervals for the comb-shape mapping by predefinition, preconfiguration, or receiving a downlink control signaling from a network device.

As an implementation, the processing module 1902 is further configured to: map the physical sidelink channel that is transmitted through multiplexing a resource with the sidelink ranging signal to the frequency domain resource in a comb-sahpe manner.

As an implementation, for the processing module 1902, the number of the frequency domain intervals for the comb-shape mapping of the sidelink ranging signal is the same as the number of frequency domain intervals for the comb-shape mapping of the physical sidelink channel.

As an implementation, for the processing module 1902, an initial frequency domain offset for the comb-shape mapping of the sidelink ranging signal is in a determined mapping relation with an initial frequency domain offset for the comb-shape mapping of the physical sidelink channel; and/or, the initial frequency domain offset for the comb-shape mapping of the sidelink ranging signal is in a determined mapping relation with a frequency domain location of the physical sidelink channel.

The communication apparatus 1900, which is a receiving terminal, includes: the transceiver module 1901.

The transceiver module 1901 is configured to receive a first sidelink transmission sent through multiplexing a resource by a transmitting terminal, in which the first sidelink transmission of a sidelink ranging signal and a physical sidelink channel is performed by the transmitting terminal through a FDM and/or a TDM. The physical sidelink channel at least including one of: a first physical sidelink channel for transmitting first sidelink control information or a second physical sidelink channel for transmitting second sidelink control information and/or sidelink data; in which, the first sidelink control information and the second sidelink control information are related to a transmission of sidelink data and/or a transmission of the sidelink ranging signal; and the first physical sidelink channel, the second physical sidelink channel and/or a sidelink ranging signal transmission are associated with each other.

As an implementation, the transceiver module 1901 is further configured to: map the sidelink ranging signal and the physical sidelink channel on different time resource locations of a consecutive time resource to perform the first sidelink transmission; and/or transmit the sidelink ranging signal and the first physical sidelink channel through the FDM on a time resource occupied by the first physical sidelink channel.

As an implementation, for the transceiver module 1901, the first sidelink transmission and a second sidelink transmission occupy different frequency resource locations on a same carrier of a same time resource, in which the second sidelink transmission does not include the sidelink ranging signal.

As an implementation, for the transceiver module 1901, the first sidelink transmission and the second sidelink transmission include resepctive first physical sidelink channels.

As an implementation, for the transceiver module 1901, a format of the first sidelink control information, transmitted in the first sidelink transmission, carried on the first physical sidelink channel is the same as a format of the second sidelink control information, transmitted in the second sidelink transmission, carried on the first physical sidelink channel.

As an implementation, the transceiver module 1901 is further configured to: map the first sidelink control information and the second sidelink control information to a same time-frequency resource location of the respective first physical sidelink channels.

As an implementation, the transceiver module 1901 is further configured to: in response to the first sidelink control information not including 2nd stage SCI and 1st stage SCI of the first sidelink control information occupying a frequency resource less than a frequency resource occupied by the sidelink ranging signal, receive part of the sidelink ranging signal on remaining REs, not occupied by the 1st stage SCI, on a target time domain symbol occupied by the 1st stage SCI; or in response to the first sidelink control information comprising the 2nd stage SCI, receive the 2nd stage SCI on remaining REs, not occupied by the 1st stage SCI, on the target time domain symbol, or receive the 2nd stage SCI on consecutive time domain symbols located after the target time domain symbol.

As an implementation, for the transceiver module 1901, a frequency resource allocation granularity of the sidelink ranging signal is set to be an integer multiple of a minimum frequency domain resource allocation granularity of the sidelink data transmission.

As an implementation, for the transceiver module 1901, a respective transmit power of the first sidelink transmission on each time domain symbol in a transmission time is equal to each other, a respective starting location of an occupied frequency domain resource on each time domain symbol is the same, and a respective size of an occupied frequency domain resource on each time domain symbol is the same.

As an implementation, for the transceiver module 1901, there is a protection interval between the transmission of the sidelink ranging signal and the transmission of the physical sidelink channel.

As an implementation, for the transceiver module 1901, a transmit power used by the transmission of the sidelink ranging signal is different from the transmit power of the transmission of the physical sidelink channel; or a frequency domain bandwidth used by the transmission of the sidelink ranging signal is different from the frequency domain bandwidth used by the transmission of the physical sidelink channel; or an antenna configuration and/or a precoding matrix used by the transmission of the sidelink ranging signal is/are different from the antenna configuration and/or the precoding matrix used by the transmission of the physical sidelink channel.

As an implementation, the transceiver module 1901 is further configured to: map the sidelink ranging signal to frequency domain resources in a comb-shape manner.

As an implementation, the transceiver module 1901 is further configured to: map the physical sidelink channel that is transmitted through multiplexing a resource with the sidelink ranging signal to the frequency domain resource in a comb-shape manner.

As an implementation, for the transceiver module 1901, the number of frequency domain interval for the comb-shape mapping of the sidelink ranging signal is same as the number of frequency domain interval for the comb-shape mapping of the physical sidelink channel.

Figure 20:
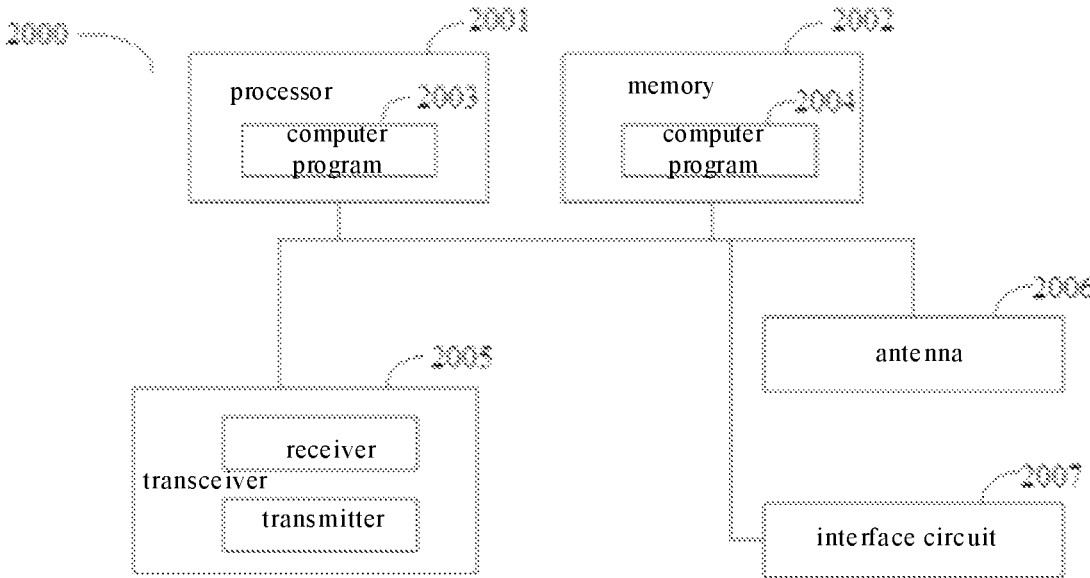
FIG. 20 is a schematic diagram illustrating a communication device according to an embodiment of the disclosure.

As an implementation, for the transceiver module 1901, an initial frequency domain offset for the comb-shape mapping of the sidelink ranging signal is in a determined mapping relation with an initial frequency domain offset for the comb-shape mapping of the physical sidelink channel; and/or, the initial frequency domain offset for the comb-shape mapping of the sidelink ranging signal is in a determined mapping relation with a frequency domain location of the physical sidelink channel. FIG. 20 is a schematic diagram illustrating a communication device 2000 according to an embodiment of the disclosure. The communication device 2000 may be a transmitting terminal, a receiving terminal, a chip, a chip system or a processor that supports the transmitting terminal to realize the above-described methods, or a chip, a chip system or a processor that supports the receiving terminal to realize the above-described methods. The device may be used to realize the methods described in the above method embodiments with reference to the description of the above-described method embodiments.

The communication device 2000 may include one or more processors 2001. The processor 2001 may be a general purpose processor or a dedicated processor, such as, a baseband processor and a central processor. The baseband processor is used for processing communication protocols and communication data. The central processor is used for controlling the communication device (e.g., base station, baseband chip, terminal device, terminal device chip, central unit (CU) or a distributed unit (DU)), executing computer programs, and processing data of the computer programs.

As an implementation, the communication device 2000 may include one or more memories 2002 on which computer programs 2004 may be stored. The processor 2001 executes the computer programs 2004 to cause the communication device 2000 to perform the methods described in the above method embodiments. As an implementation, the memory 2002 may also store data. The communication device 2000 and the memory 2002 may be provided separately or may be integrated together.

As an implementation, the communication device 2000 may also include a transceiver 2005 and an antenna 2006. The transceiver 2005 may be referred to as transceiver unit, transceiver machine, or transceiver circuit, for realizing a transceiver function. The transceiver 2005 may include a receiver and a transmitter. The receiver may be referred to as receiver machine or receiving circuit, for realizing a receiving function. The transmitter may be referred to as transmitter machine or transmitting circuit, for realizing a transmitting function.

As an implementation, the communication device 2000 may also include one or more interface circuits 2007. The interface circuits 2007 are used to receive code instructions and transmit them to the processor 2001. The processor 2001 runs the code instructions to cause the communication device 2000 to perform the method described in the method embodiments.

In an implementation, the processor 2001 may include a transceiver for implementing the receiving and transmitting functions. The transceiver may be, for example, a transceiver circuit, an interface, or an interface circuit. The transceiver circuit, interface, or interface circuit for implementing the receiving and transmitting functions may be separated or may be integrated together. The transceiver circuit, interface, or interface circuit described above may be used for reading and writing code/data, or may be used for signal transmission or delivery.

In an implementation, the processor 2001 may store a computer program 2003. When the computer program 2003 is run on the processor 2001, the communication device 2000 is caused to perform the methods described in the method embodiments above. The computer program 2003 may be cured in the processor 2001, in which case the processor 2001 may be implemented by hardware.

In an implementation, the communication device 2000 may include circuits. The circuits may implement the sending, receiving or communicating function in the preceding method embodiments. The processors and transceivers described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processors and the transceivers can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication device in the above description of embodiments may be a transmitting terminal or a receiving terminal (e.g., first terminal device in the preceding method embodiments), but the scope of the communication device described in the disclosure is not limited thereto, and the structure of the communication device may not be limited by FIG. 20. The communication device may be a stand-alone device or may be part of a larger device. For example, the communication device may be:

(1) a stand-alone IC, chip, chip system or subsystem;

(2) a collection of ICs including one or more ICs, optionally, the collection of ICs may also include storage components for storing data and computer programs;

(3) an ASIC, such as a modem;

(4) modules that can be embedded within other devices;

(5) receivers, terminal devices, smart terminal devices, cellular phones, wireless devices, handheld machines, mobile units, in-vehicle devices, network devices, cloud devices, artificial intelligence devices, and the like; and (6) others.

Figure 21:
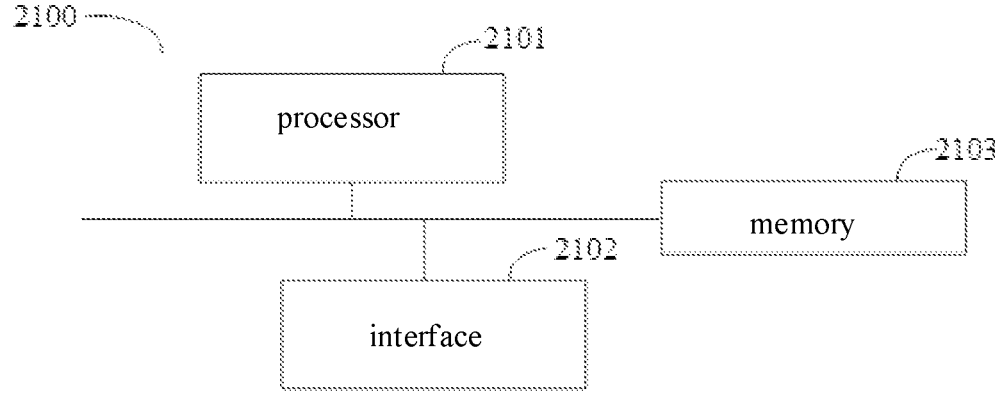
FIG. 21 is a schematic diagram illustrating a chip according to an embodiment of the disclosure.

The case where the communication device may be a chip or chip system is described with reference to the schematic structure of the chip shown in FIG. 21. The chip shown in FIG. 21 includes a processor 2101 and an interface 2102. There may be one or more processors 2101, and there may be multiple interfaces 2102.

As an implementation, the chip further includes a memory 2103, configured to store necessary computer programs and data.

It is understandable by those skilled in the art that various illustrative logical blocks and steps listed in the embodiments of the disclosure may be implemented by electronic hardware, computer software, or a combination of both. Whether such function is implemented by hardware or software depends on the particular application and the entire system design requirements. Those skilled in the art may, for each particular application, use various methods to implement the described functions, but such implementation should not be understood as beyond the scope of protection of the embodiments of the disclosure.

Embodiments of the disclosure also provide a system for adjusting a maximum number of transmission layers, which includes a communication apparatus as a transmitting terminal (e.g. a terminal device in the aforementioned method embodiments) and a communication apparatus as a receiving terminal in the aforementioned embodiment of FIG. 19, or, a communication apparatus as a transmitting terminal (e.g. a terminal device in the aforementioned method embodiment) and a communication apparatus as a receiving terminal in the aforementioned embodiment of FIG. 20.

The disclosure also provides a readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The above embodiments may be implemented in whole or in part by software, hardware, firmware, or any combination thereof. When implemented using software, the above embodiments may be implemented, in whole or in part, in the form of computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., by using coaxial cables, fiber optics, or digital subscriber lines (DSLs) or wirelessly (e.g., by using infrared wave, wireless wave, or microwave). The computer-readable storage medium may be any usable medium to which the computer has access or a data storage device integrated by one or more usable mediums, such as a server and a data center. The usable medium may be a magnetic medium (e.g., floppy disk, hard disk, and tape), an optical medium (e.g., a high-density digital video disc (DVD)), or a semiconductor medium (e.g., a solid state disk (SSD)).

Those skilled in the art understands that the first, second, and other various numerical numbers involved in the disclosure are only described for the convenience of differentiation, and are not used to limit the scope of the embodiments of the disclosure, but to indicate the order of precedence.

The term "at least one" in the disclosure may also be described as one or more, and the term "multiple" may be two, three, four, or more, which is not limited in the disclosure. In the embodiments of the disclosure, for technical features, "first", "second", and "third", and "A", "B", "C" and "D" are used to distinguish different technical features, the technical features described using the "first", "second", and "third", and "A", "B", "C" and "D" do not indicate any order of precedence or magnitude.

The correspondences shown in the tables in this disclosure may be configured or predefined. The values of information in the tables are merely examples and may be configured as other values, which are not limited in the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the headings of the above tables may be other names that can be understood by the communication device, and the values or representations of the parameters may be other values or expressions that can be understood by the communication device. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, predefine, store, pre-store, pre-negotiate, pre-configure, curing, or pre-burn.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above implementations are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the stated claims.

What is claimed is:

1. A resource multiplexing method for sidelink ranging, performed by a transmitting terminal, comprising:
performing a first sidelink transmission of a sidelink ranging signal and a physical sidelink channel through a time-division multiplexing within a same time unit, wherein the sidelink ranging signal is a reference signal for measuring at least one of a distance or an angle; and
wherein the physical sidelink channel comprises at least one of:
a first physical sidelink channel for transmitting first sidelink control information; or
a second physical sidelink channel for transmitting sidelink data;
wherein the first sidelink control information is related to at least one of a transmission of the sidelink data or a transmission of the sidelink ranging signal; and at least one pair of the first physical sidelink channel, a sidelink ranging signal transmission are associated with each other;
wherein the performing the first sidelink transmission includes mapping the sidelink ranging signal and the physical sidelink channel on different time resource locations of a consecutive time resource, the mapping comprising:
providing a protection interval between the transmission of the sidelink ranging signal and the transmission of the physical sidelink channel;
the method further comprising: determining a length of the protection interval by predefinition or preconfiguration; or, determining the length of the protection interval based on at least one of a carrier frequency or a subcarrier spacing used in the first sidelink transmission;
wherein a transmit power used by the transmission of the sidelink ranging signal is different from a transmit power used by the transmission of the physical sidelink channel; or a frequency domain bandwidth used by the transmission of the sidelink ranging signal is different from a frequency domain bandwidth used by the transmission of the physical sidelink channel; or at least one of an antenna configuration or a precoding matrix used by the transmission of the sidelink ranging signal are different from at least one of an antenna configuration or a precoding matrix used by the transmission of the physical sidelink channel.

2. The method of claim 1, further comprising:
performing the first sidelink transmission of the sidelink ranging signal and the first physical sidelink channel through frequency-division multiplexing on a time resource occupied by the first physical sidelink channel.

3. The method of claim 2, further comprising:
mapping the sidelink ranging signal to a frequency domain resource in a comb-shape manner;
wherein the method further comprises: determining a number of frequency domain intervals for a comb-shape mapping by predefinition, preconfiguration, or receiving a downlink control signaling from a network device.

4. The method of claim 3, further comprising:
mapping the physical sidelink channel that is transmitted through resource multiplexing with the sidelink ranging signal to a frequency domain resource in a comb-shape manner;
wherein a number of frequency domain intervals for a comb-shape mapping of the sidelink ranging signal is same as a number of frequency domain intervals for a comb-shape mapping of the physical sidelink channel; or
wherein the method comprises at least one of: an initial frequency domain offset for a comb-shape mapping of the sidelink ranging signal is in a determined mapping relation with an initial frequency domain offset for a comb-shape mapping of the physical sidelink channel; or, the initial frequency domain offset for the comb-shape mapping of the sidelink ranging signal is in a determined mapping relation with a frequency domain location of the physical sidelink channel.

5. The method of claim 1, wherein the first sidelink transmission and a second sidelink transmission occupy different frequency resource locations on a same carrier of a same time resource, wherein the second sidelink transmission does not comprise the sidelink ranging signal.

6. The method of claim 5, wherein the first sidelink transmission and the second sidelink transmission comprise respective first physical sidelink channels;
wherein the method further comprises: mapping the first sidelink control information and the second sidelink control information to a same time-frequency resource location of respective first physical sidelink channels.

7. The method of claim 5, wherein a format of the first sidelink control information, transmitted in the first sidelink transmission, carried on the first physical sidelink channel is same as a format of the second sidelink control information, transmitted in the second sidelink transmission, carried on the first physical sidelink channel; or
wherein the first sidelink control information is sidelink control information corresponding to the sidelink ranging signal, and the method further comprises:
in response to the first sidelink control information not comprising $2^{nd}$ stage Sidelink control information (SCI) and $1^{st}$ stage SCI of the first sidelink control information occupying a frequency resource less than a frequency resource occupied by the sidelink ranging signal, determining a target time domain symbol occupied by the $1^{st}$ stage SCI, and mapping part of the sidelink ranging signal to remaining resource elements (REs), not occupied by the $1^{st}$ stage SCI, on the target time domain symbol; or in response to the first sidelink control information comprising the $2^{nd}$ stage SCI, mapping the $2^{nd}$ stage SCI to remaining REs, not occupied by the $1^{st}$ stage SCI, on the target time domain symbol, or mapping the $2^{nd}$ stage SCI to consecutive time domain symbols located after the target time domain symbol; or wherein a frequency domain resource allocation granularity of the first sidelink transmission is an integer multiple of a minimum frequency domain resource allocation granularity of the second sidelink transmission.

8. The method of claim 1, wherein a respective transmit power of the first sidelink transmission on each time domain symbol in a transmission time is equal to each other, a respective starting location of each occupied frequency domain resource on each time domain symbol is same, and a respective size of each occupied frequency domain resource on each time domain symbol is same.

9. A resource multiplexing method for sidelink ranging, performed by a receiving terminal, comprising:

receiving a first sidelink transmission sent through resource multiplexing by a transmitting terminal, wherein the first sidelink transmission of a sidelink ranging signal and a physical sidelink channel is performed by the transmitting terminal through a time-division multiplexing;

wherein the sidelink ranging signal is a reference signal for measuring at least one of a distance or an angle; and the physical sidelink channel comprises at least one of:

a first physical sidelink channel for transmitting first sidelink control information; or a second physical sidelink channel for transmitting sidelink data;

wherein the first sidelink control information is related to at least one of a transmission of the sidelink data or a transmission of the sidelink ranging signal; and at least one pair of the first physical sidelink channel, a sidelink ranging signal transmission are associated with each other;

wherein the method further comprises mapping the sidelink ranging signal and the physical sidelink channel on different time resource locations of a consecutive time resource, comprising: providing a protection interval between the transmission of the sidelink ranging signal and the transmission of the physical sidelink channel;

wherein a transmit power of the transmission of the sidelink ranging signal is different from a transmit power of the transmission of the physical sidelink channel; or a frequency domain bandwidth of the transmission of the sidelink ranging signal is different from a frequency domain bandwidth of the transmission of the physical sidelink channel; or at least one of an antenna configuration or a precoding matrix of the transmission of the sidelink ranging signal is different from at least one of an antenna configuration or a precoding matrix of the transmission of the physical sidelink channel.

10. The method of claim 9, further comprising:

transmitting the sidelink ranging signal and the first physical sidelink channel through frequency-division multiplexing on a time resource occupied by the first physical sidelink channel.

11. The method of claim 10, further comprising:

mapping the sidelink ranging signal to a frequency domain resource in a comb-shape manner;

wherein the method comprises mapping the physical sidelink channel that is transmitted through resource multiplexing with the sidelink ranging signal to a frequency domain resource in a comb-shape manner;

wherein a number of frequency domain intervals for a comb-shape mapping of the sidelink ranging signal is same as a number of frequency domain intervals for a comb-shape mapping of the physical sidelink channel; or wherein the method further comprises: an initial frequency domain offset for a comb-shape mapping of the sidelink ranging signal is in a determined mapping relation with an initial frequency domain offset for a comb-shape mapping of the physical sidelink channel; or the initial frequency domain offset for the comb-shape mapping of the sidelink ranging signal is in a determined mapping relation with a frequency domain location of the physical sidelink channel.

12. The method of claim 9, wherein the first sidelink transmission and a second sidelink transmission occupy different frequency resource locations on a same carrier of a same time resource, wherein the second sidelink transmission does not comprise the sidelink ranging signal.

13. The method of claim 12, wherein the first sidelink transmission and the second sidelink transmission comprise respective first physical sidelink channels;

wherein the method further comprises: mapping the first sidelink control information and the second sidelink control information to a same time-frequency resource location of the respective first physical sidelink channels.

14. The method of claim 12, wherein a format of the first sidelink control information, transmitted in the first sidelink transmission, carried on the first physical sidelink channel is same as a format of the second sidelink control information, transmitted in the second sidelink transmission, carried on the first physical sidelink channel;

wherein the first sidelink control information is sidelink control information corresponding to the sidelink ranging signal, and the method further comprises:

in response to the first sidelink control information not comprising $2^{nd}$ stage SCI and $1^{st}$ stage SCI of the first sidelink control information occupying a frequency resource less than a frequency resource occupied by the sidelink ranging signal, receiving part of the sidelink ranging signal on remaining REs, not occupied by the $1^{st}$ stage SCI, on a target time domain symbol occupied by the $1^{st}$ stage SCI; or in response to the first sidelink control information comprising the $2^{nd}$ stage SCI, receiving the $2^{nd}$ stage SCI on remaining REs, not occupied by the $1^{st}$ stage SCI, on the target time domain symbol, or receiving the $2^{nd}$ stage SCI on consecutive time domain symbols located after the target time domain symbol;

wherein a frequency resource allocation granularity of the sidelink ranging signal is set to be an integer multiple of a minimum frequency domain resource allocation granularity of the sidelink data transmission.

15. The method of claim 9, wherein a respective transmit power of the first sidelink transmission on each time domain symbol in a transmission time is equal to each other, a respective starting location of each occupied frequency domain resource on each time domain symbol is same, and a respective size of each occupied frequency domain resource on each time domain symbol is same.

16. A communication device, comprising a processor and a memory having a computer program stored thereon, wherein when the computer program is executed by the processor, the processor is configured to:

perform a first sidelink transmission of a sidelink ranging signal and a physical sidelink channel through a time-division multiplexing within a same time unit, wherein the sidelink ranging signal is a reference signal for measuring at least one of a distance or an angle; and wherein the physical sidelink channel comprises at least one of:

a first physical sidelink channel for transmitting first sidelink control information; or a second physical sidelink channel for transmitting sidelink data;

wherein the first sidelink control information is related to at least one of a transmission of the sidelink data or a transmission of the sidelink ranging signal; and at least one of the first physical sidelink channel, a sidelink ranging signal transmission are associated with each other;

wherein the processor is configured to perform the first sidelink transmission by mapping the sidelink ranging signal and the physical sidelink channel on different time resource locations of a consecutive time resource by:

providing a protection interval between the transmission of the sidelink ranging signal and the transmission of the physical sidelink channel;

wherein the processor is configured to determine a length of the protection interval by predefinition or preconfiguration; or, determine the length of the protection interval based on at least one of a carrier frequency or a subcarrier spacing used in the first sidelink transmission;

wherein a transmit power used by the transmission of the sidelink ranging signal is different from a transmit power used by the transmission of the physical sidelink channel; or a frequency domain bandwidth used by the transmission of the sidelink ranging signal is different from a frequency domain bandwidth used by the transmission of the physical sidelink channel; or at least one of an antenna configuration or a precoding matrix used by the transmission of the sidelink ranging signal are different from at least one of an antenna configuration or a precoding matrix used by the transmission of the physical sidelink channel.

17. A communication device, comprising a processor and a memory having a computer program stored thereon, wherein when the computer program is executed by the processor, the method of claim 9 is performed.

18. A non-transitory computer readable storage medium for storing instructions, wherein when the instructions are executed, the method of claim 1 is performed.

* * * * *